United States Patent [19]

Sugiyama et al.

[11] Patent Number: 4,984,068
[45] Date of Patent: Jan. 8, 1991

[54] MOTION-ADAPTIVE DEVICE FOR SEPARATING LUMINANCE SIGNAL AND COLOR SIGNAL

[75] Inventors: Kenji Sugiyama, Noda; Yasuyuki Katayama, Iwai; Nobuyuki Suzuki; Tomoaki Uchida, both of Noda; Tatsushi Kouguchi, Iwai, all of Japan

[73] Assignee: Victor Company of Japan, Ltd., Japan

[21] Appl. No.: 489,167

[22] Filed: Mar. 6, 1990

Related U.S. Application Data

[62] Division of Ser. No. 289,804, Dec. 27, 1988.

[30] Foreign Application Priority Data

Dec. 29, 1987 [JP] Japan .................. 62-336121
Dec. 29, 1987 [JP] Japan .................. 62-336122
Dec. 29, 1987 [JP] Japan .................. 62-336123

[51] Int. Cl.$^5$ .............................................. H04N 9/78
[52] U.S. Cl. ................................. 358/31; 358/21 R; 358/105
[58] Field of Search .................... 358/31, 105, 21 R

[56] References Cited

U.S. PATENT DOCUMENTS 4,736,252 4/1988 Nakagawa et al. ............... 358/21 R

FOREIGN PATENT DOCUMENTS 59-77782  5/1984 Japan ................................. 358/31
60-57789  4/1985 Japan ................................. 358/31
61-61591  3/1986 Japan .
55-123280 12/1986 Japan ................................. 358/31
61-274493 12/1986 Japan .
62-86994  4/1987 Japan .
2054313   2/1981 United Kingdom ............... 358/31

OTHER PUBLICATIONS

"Motion Detector Using NTSC Two-Frame Difference and Spatio-Temporal Accumulation", 1987 National Convention Record of the Institute of Television Engineers of Japan, Koji Kudo et al.

Primary Examiner—John W. Shepperd
Attorney, Agent, or Firm—Lowe, Price, LeBlanc, Becker & Shur

[57] ABSTRACT

A motion detector detects motion of pictures represented by a composite color television signal and generates a motion signal representing the detected motion of pictures. A spatiotemporal filter extracts a color signal from the composite color television signal. A subtractor subtracts the color signal from the composite color television signal and thereby generates a luminance signal. The spatiotemporal filter includes a spatial filter. A pass band of the spatial filter is varied in accordance with the motion signal.

10 Claims, 10 Drawing Sheets

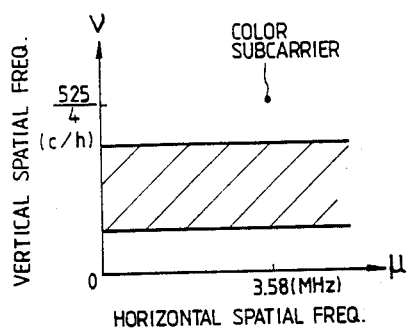
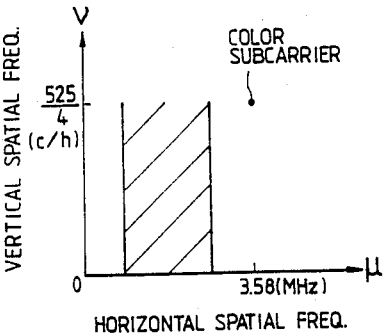
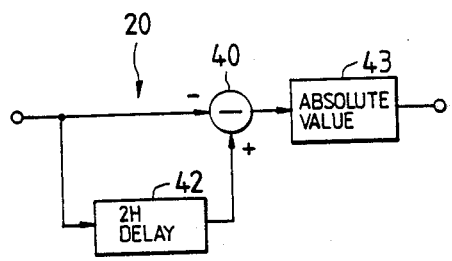
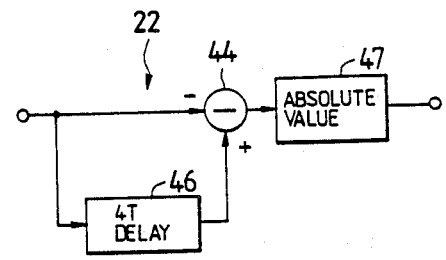

FIG. 17
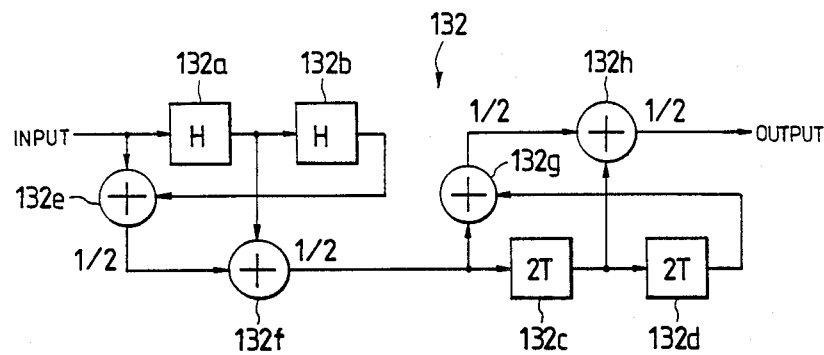
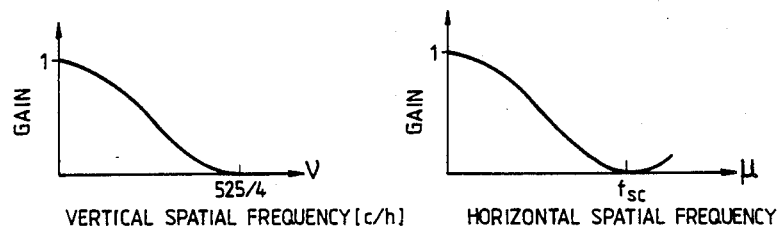
FIG. 18(A)          FIG. 18(B)

under 4,984,068

MOTION-ADAPTIVE DEVICE FOR SEPARATING LUMINANCE SIGNAL AND COLOR SIGNAL

This application is a division of application Ser. No. 07/289,804 filed Dec. 27, 1988.

BACKGROUND OF THE INVENTION

1. Field of the Invention

This invention relates to a motion-adaptive device for separating a luminance signal and a color signal in color video systems such as color television receivers. Such a signal separation device is generally called a Y-signal/C-signal separation filter.

2. Description of the Prior Art

Color television receivers include a filtering device for separately deriving a luminance signal (Y signal) and a color signal (carrier chrominance signal, C signal) from a composite color television signal.

Typical motion-adaptive Y/C signal separation devices include two filters each for separating a luminance signal and a color signal, the first filter being responsive to a correlation between lines in a common picture and the second filter being responsive to a correlation between frames. One of the two filters is selected in accordance with an output signal from a motion detector sensing motion of pictures.

Japanese published unexamined patent application No. 61-274493 discloses a digital decoder which includes a Y/C signal separation circuit responsive to a variation in a common picture, a Y/C signal separation circuit responsive to motion of pictures, and a band pass filter. Output signals from the two separation circuits and the band pass filer are mixed in accordance with spatial variations and time-dependent variations in pictures to separately derive a final luminance signal and a final color signal.

The 1987 National Convention Record of the Institute of Television Engineers of Japan includes a paper titled "Motion Detector Using NTSC Two-Frame Difference and Spatio-Temporal Accumulation" in which time and space are expanded in relation to the detection of motion of pictures in order to improve the accuracy of the motion detection.

SUMMARY OF THE INVENTION

It is an object of this invention to provide an excellent motion-adaptive device for separating a luminance signal and a color signal.

It is another object of this invention to provide a reliable motion detector.

In a first device of this invention, a motion detector detects motion of pictures represented by a composite color signal and generates a motion signal representing the detected motion of pictures. A time-direction filter processes the composite color signal. A variable vertical-direction filter processes the composite color signal. A mixer mixes output signals from the time-direction filter and the vertical-direction filter at a mixing rate which depends on the motion signal. A variable horizontal-direction filter extracts a color signal from an output signal of the mixer. A subtracter subtracts the color signal from the composite color signal and thereby generates a luminance signal. A vertical-direction variation detector detects a difference between levels of the composite color signal at sampling points separated vertically in a picture. A horizontal-direction variation detector detects a difference between levels of the composite color signal at sampling points separated horizontally in a picture. Pass bands of the vertical-direction band pass filter and the horizontal-direction band pass filter are controlled in accordance with the motion signal and output signals from the vertical-direction variation detector and the horizontal-direction variation detector.

In a second device of this invention, a motion detector detects motion of pictures represented by a composite color signal and generates a motion signal representing the detected motion of pictures. A spatiotemporal filter processes the composite color signal. The signal processing in the spatiotemporal filter is varied in accordance with the motion signal. A color signal and a luminance signal are separately derived from an output signal of the spatiotemporal filter and the composite color signal. The motion detector includes means for deriving a difference between frames of the composite color signal and generating a difference signal representative of the derived difference, means for deriving an absolute value of the difference signal and generating an absolute value signal representative of the derived absolute value, a first nonlinear circuit limiting the absolute value signal, a spatiotemporal low pass filter processing an output signal from the first nonlinear circuit, and a second nonlinear circuit limiting an output signal from the spatiotemporal low pass filter and converting the output signal from the spatiotemporal low pass filter into the motion signal.

In a third device of this invention, a motion detector detects motion of pictures represented by a composite color signal and generates a motion signal representing the detected motion of pictures. A time-direction filter processes the composite color signal. A vertical-direction filter processes the composite color signal. A mixer mixes output signals from the time-direction filter and the vertical-direction filter at a mixing rate which depends on the motion signal. A horizontal-direction filter extracts a color signal from an output signal of the mixer. A subtracter subtracts the color signal from the composite color signal and thereby generates a luminance signal. A pass band of the horizontal-direction filter is varied in accordance with the motion signal.

A detector of this invention includes means for deriving a difference between frames of the composite color signal and generating a difference signal representative of the derived difference, means for deriving an absolute value of the difference signal and generating an absolute value signal representative of the derived absolute value, a first nonlinear circuit limiting the absolute value signal, a spatiotemporal low pass filter processing an output signal from the first nonlinear circuit, and a second nonlinear circuit limiting an output signal from the spatiotemporal low pass filter and converting the output signal from the spatiotemporal low pass filter into the motion signal.

BRIEF DESCRIPTION OF THE DRAWINGS

FIG. 3 is a diagram showing a two-dimensional spatial frequency range detected by the vertical direction variation detector of FIG. 1.

FIG. 4 is a diagram showing a two-dimensional spatial frequency range detected by the horizontal direction variation detector of FIG. 1.

FIG. 5 is a block diagram of the vertical direction variation detector of FIG. 1.

FIG. 6 is a block diagram of the horizontal direction variation detector of FIG. 1.

FIG. 17 is a block diagram of the spatial low pass filter of FIG. 13.

FIGS. 18(A) and 18(B) are diagrams showing frequency characteristics of the spatial low pass filter of FIG. 13 and 17.

DESCRIPTION OF THE FIRST PREFERRED EMBODIMENT

Figure 1:
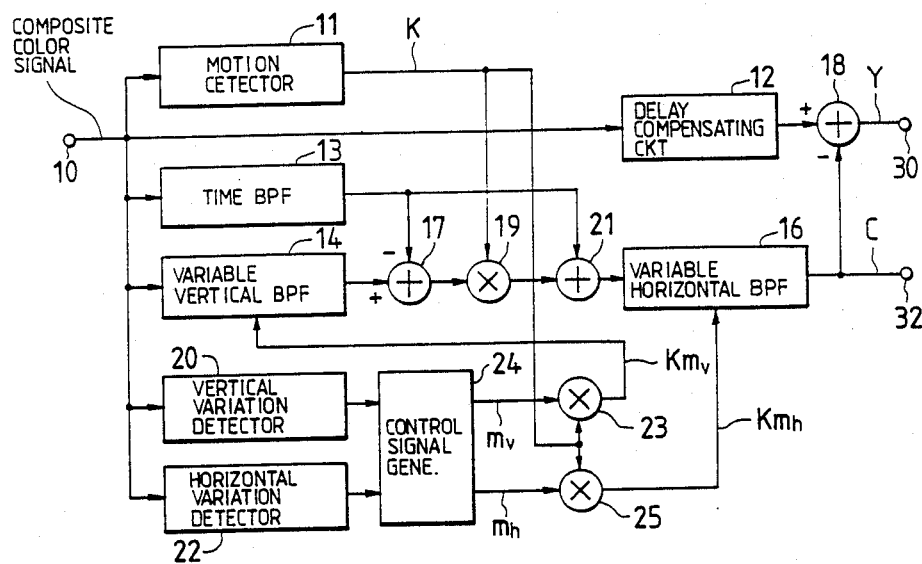
FIG. 1 is a block diagram of a motion-adaptive device for separating a luminance signal and a color signal according to a first embodiment of this invention.

With reference to FIG. 1, an input terminal 10 is subjected to a digital composite color television signal which is derived from an analog composite color television signal by an analog-to-digital (A/D) converter (not shown). The A/D converter samples the analog composite color television signal at a predetermined sampling period T and sequentially converts sampled levels into corresponding digital data. The digital composite color television signal is also referred to as a composite color signal. The digital composite color television signal is fed via the input terminal 10 to a motion detector 11, a delay compensating circuit 12, a time direction digital band pass filter (BPF) 13, a vertical direction digital band pass filter (BPF) 14 of a variable type, a vertical direction variation detector 20, and a horizontal direction variation detector 22.

The motion detector 11 includes frame memories and a subtracter. The motion detector 11 calculates the difference between data at the same points of two different frames and thereby detects the motion of pictures represented by the input composite color television signal. An output signal from the motion detector 11 represents a motion coefficient "k" which varies between 0 and 1 in accordance with the degree of motion of pictures. The output signal from the motion detector 11 will be referred to as the motion signal "k" hereinafter. The motion detector 11 may be of the known type.

Figure 10:
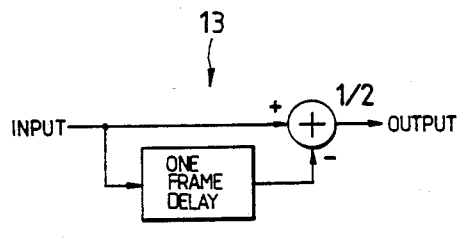
FIG. 10 is a block diagram of the time direction band pass filter of FIG. 1.
Figure 11:
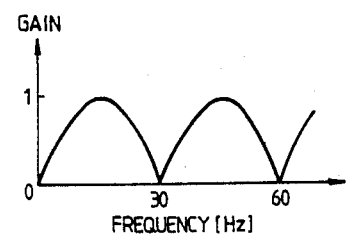
FIG. 11 is a diagram showing frequency characteristics of the time direction band pass filter of FIGS. 1 and 10.

The time direction BPF 13 removes high frequency components and low frequency components from the input composite color television signal with respect to motion of pictures between two or more successive frames. As shown in FIG. 10, the time direction BPF 13 includes a one-frame delay circuit 13a and a subtracter 13b. The composite color television signal is applied to an input terminal of the delay circuit 13a and a plus input terminal of the subtracter 13b. An output signal from the delay circuit 13b is fed to a minus input terminal of the subtracter 13b. An output signal from the subtracter 13b is used as the output signal from the time direction BPF 13. As shown in FIG. 11, the frequency characteristics of the time direction BPF 13 correspond to the curve of the absolute values of a sinusoidal function.

An output signal from the delay compensating circuit 12 which is derived from the input composite color television signal through a delay compensating process is applied to a plus input terminal of a subtracter 18. As will be described hereinafter, a minus input terminal of the subtracter 18 is subjected to a color signal (C signal). The delay compensating circuit 12 removes a phase difference or delay time difference between the color signal applied to the subtracter 18 and the color signal components in the composite signal applied to the subtracter 18 so that the subtracter 18 can extract accurate luminance signal (Y signal) components. Such a phase difference or delay time difference is caused by delays in the motion detector 11, the time direction BPF 13, the vertical direction BPF 14, and a horizontal direction BPF 16 described hereinafter.

An output signal from the vertical direction BPF 14 is applied to a plus input terminal of a subtracter 17. A minus input terminal of the subtracter 17 is subjected to an output signal from the time direction BPF 13. An output signal from the subtracter 17 is applied to a first input terminal of a multiplier 19. A second input terminal of the multiplier 19 is subjected to the motion signal "k". An output signal from the multiplier 19 is applied to a first input terminal of an adder 21. A second input terminal of the adder 21 is subjected to the output signal from the time direction BPF 13. The combination of the subtracter 17, the multiplier 19, and the adder 21 serves to mix the output signals from the BPFs 13 and 14 at a rate which depends on the motion coefficient "k".

An input terminal of a horizontal direction digital band pass filter (BPF) 16 of a variable type is subjected to an output signal from the adder 21 which corresponds to a mixture of the output signals from the BPFs 13 and 14. The horizontal direction BPF 16 processes the input signal into a color signal (a carrier chrominance signal) C. The color signal C is applied to a minus input terminal of the subtracter 18 and an output terminal 32.

The subtracter 18 generates a luminance signal Y in accordance with the output signal from the delay compensating circuit 12 and the color signal C. Specifically, the luminance signal Y corresponds to data which are equal to data of the output signal from the delay compensating circuit 12 minus data of the color signal C.

The vertical direction variation detector 20 calculates the difference between data at vertically separated sampling points in a picture and generates a signal representative of the calculated difference. The output signal from the detector 20 is fed to a control signal generator 24. The horizontal direction variation detector 22 calculates the difference between data at horizontally separated sampling points in a picture and generates a signal representative of the calculated difference. The output signal from the detector 22 is fed to the control signal generator 24.

The control signal generator 24 generate two primary control signals "mv" and "mh" on the bais of the output signals from the detectors 20 and 22. The first primary control signal "mv" is fed to a first input terminal of a multiplier 23. A second input terminal of the multiplier 23 is subjected to the motion signal "k". The multiplier 23 generates a final control signal "kmv" which corresponds to the primary control signal "mv" multiplied by the motion signal "k". The final control signal "kmv" is applied to the vertical direction BPF 14. Characteristics of the vertical direction BPF 14 are varied in accordance with the final control signal "kmv". The second primary control signal "mh" is fed to a first input terminal of a multiplier 25. A second input terminal of the multiplier 25 is subjected to the motion signal "k". The multiplier 25 generates a final control signal "kmh" which corresponds to the primary control signal "mh" multiplied by the motion signal "k". The final control signal "kmh" is applied to the horizontal direction BPF 16. Characteristics of the horizontal direction BPF 16 are varied in_accordance with the final control signal "kmh".

Figure 2:
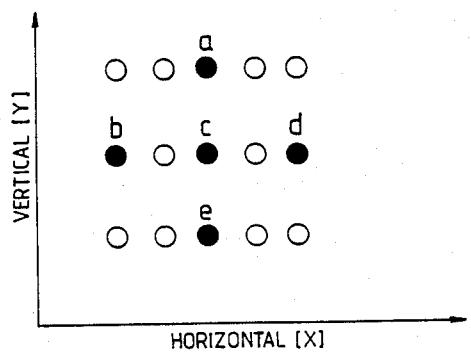
FIG. 2 is a diagram of an arrangement of sampling points in the case of an NTSC signal.

An NTSC composite color signal is sampled at a frequency which equals four times the color subcarrier frequency fsc. As shown in FIG. 2, the sampled data series takes a two-dimensional arrangement in a picture screen. In FIG. 2, black and white circles denote respective sampling points.

The vertical direction variation detector 20 and the horizontal direction variation detector 22 are designed so that they are insensitive to the color subcarrier which is a dc component of the color signal. Specifically, in respect of the data at the point "c" of FIG. 2, the vertical direction variation detector 20 calculates the absolute value of the difference between the data at the points "a" and "e" of FIG. 2. In respect of the data at the point "c" of FIG. 2, the horizontal direction variation detector 22 calculates the absolute value of the difference between the data at the points "b" and "d" of FIG. 2.

FIG. 3 shows characteristics of the vertical direction variation detector 20. In FIG. 3, the hatched region corresponds to the spatial frequency range detected by the vertical direction variation detector 20. FIG. 4 shows characteristics of the horizontal direction variation detector 22. In FIG. 4, the hatched region corresponds to the spatial frequency range detected by the horizontal direction variation detector 22. As understood from FIGS. 3 and 4, the detected spatial frequency ranges extend outside the point of the color subcarrier. In addition, as understood from FIGS. 3 and 4, high frequency components of the luminance signal and also high frequency components of the color signal can be detected. In FIGS. 3 and 4, the vertical spatial frequency is represented in unit of cycle/height (c/h).

As shown in FIG. 5, the vertical direction variation detector 20 includes a subtracter 40, a two-line delay circuit 42, and an absolute-value converter 43. The composite color television signal is applied to a minus input terminal of the subtracter 40 and an input terminal of the delay circuit 42. An output signal from the delay circuit 42 is applied to a plus input terminal of the subtracter 40. The delay circuit 42 delays the input composite color television signal by a period corresponding to two horizontal scanning periods (2H). The subtracter 40 calculates the difference between the delayed signal and the non-deleyed signal which correspond to the data at the points "a" and "e" of FIG. 2. The absolute-value converter 43 calculates the absolute value of the data difference outputted from the subtracter 40. An output signal from the absolute-value converter 43 which represents the calculated absolute value is fed to the control signal generator 24 (see FIG. 1).

As shown in FIG. 6, the horizontal direction variation detector 22 includes a subtracter 44, a four-sample delay circuit 46, and an absolute-value converter 47. The composite color television signal is applied to a minus input terminal of the subtracter 44 and an input terminal of the delay circuit 46. An output signal from the delay circuit 46 is applied to a plus input terminal of the subtracter 44. The delay circuit 46 delays the input composite color television signal by a period corresponding to four sampling periods (4T). The subtracter 44 calculates the difference between the delayed signal and the non-deleyed signal which correspond to the data at the points "b" and "d" of FIG. 2. The absolute-value converter 47 calculates the absolute value of the data difference outputted from the subtracter 44. An output signal from the absolute-value converter 47 which represents the calculated absolute value is fed to the control signal generator 24 (see FIG. 1).

Figure 7:
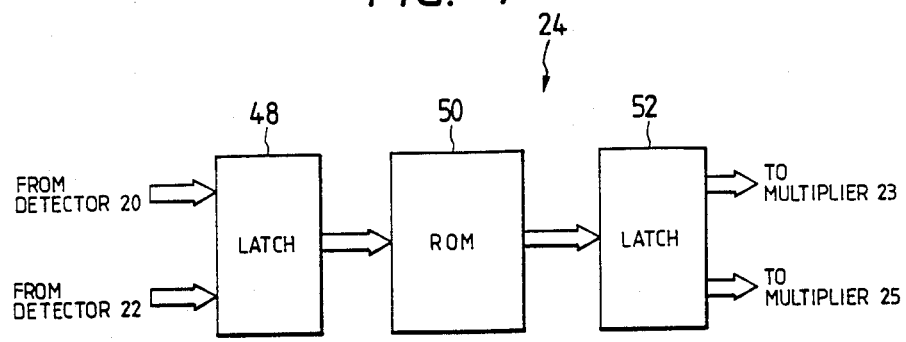
FIG. 7 is a block diagram of the control signal generator of FIG. 1.

As shown in FIG. 7, the control signal generator 24 includes latches 48 and 52, and a read-only memory (ROM) 50. The latch 48 receives data from the variation detectors 20 and 22. The data fed from each of the variation detectors 20 and 22 to the latch 48 have a plurality of bits, for example, 6 bits. The latch 48 combines the received data into an address signal outputted to the ROM 50. The address signal has a plurality of bits, for example, 12 bits. A set of predetermined control signal data are stored in respective storage locations of the ROM 50. The control signal data are read out from the storage location of the ROM 50 which is designated by the address signal fed from the latch 48. Accordingly, the ROM 50 generates the control signal data in accordance with the output signals from the variation detectors 20 and 22. The control signal data are transferred from the ROM 50 to the latch 52. The latch 52 divides the received control signal data into two primary control signals "mv" and "mh" which are fed to the multipliers 23 and 25 respectively. The control signal data preferably have four or more bits. In the case where the control signal data have 8 bits, each of the primary control signals has 4 bits.

The vertical direction BPF 14, the horizontal direction BPF 16, and the control signal data outputted from the ROM 50 are designed so that the characteristics of the BPFs 14 and 16 will basically depend on the differences or variations detetected by the variation detectors 20 and 22 in the following manner. In the case where the data difference in the vertical direction is greater than the data difference in the horizontal direction, the pass band of the vertical direction BPF 14 is widened while the pass band of the horizontal direction BPF 16 is narrowed. In the opposite case, the pass band of the vertical direction BPF 14 is narrowed while the pass band of the horizontal direction BPF 16 is widened. In the case where the data difference in the vertical direction and the data difference in the horizontal direction are substantially equal, the pass bands of the BPFs 14 and 16 are made similar to each other. Since each of the control signals to the BPFs 14 and 16 has a plurality bits as understood from the previous description, the characteristics of the BPFs 14 and 16 can be varied among closely different multi-states. Accordingly, it is possible to finely and smoothly control the characteristics of the BPFs 14 and 16.

Generally, in cases where both of a variation in the vertical direction and a variation in the horizontal direction are great, cross color tends to occur. Accordingly, in such cases, both of the pass bands of the BPFs 14 and 16 are narrowed to adequately suppress the cross color. When both of the luminance and the color vary greatly, the narrow pass bands of the BPFs 14 and 16 cause a narrow color band and increase dot interference (dot crawl). Generally, in a picture pattern having such great variations in luminance and color, the narrow color band and the dot interference are masked by variations in the luminance signal and are thus inconspicuous while the cross color is conspicuous. In view of this fact, the BPFs 14 and 16 are controlled mainly to suppress the cross color.

The control of the BPFs 14 and 16 will be described further hereinafter. As described previously, the primary control signals "mv" and "mh" are multiplied by the motion signal "k" to generate the final control signals "kmv" and "kmh". The data of the primary control signals "mv" and "mh" are variable between 0 and 1. As described previously, the data of the motion signal "k" is also variable between 0 and 1. Specifically, the data of the motion signal "k" varies from 0 to 1 as the degree of motion of pictures increases. The data of the motion signal "k" are equal to 0 when pictures are stationary or still. The data of the motion signal "k" are equal to 1 when the degree of motion of pictures is maximized. The BPFs 14 and 16 are designed so that the pass bands of the BPFs 14 and 16 will be maximized when the data of the final control signals "kmv" and "kmh" correspond to 0 and will be minimized when the data of the final control signals "kmv" and "kmh" correspond to 1.

When the data of the motion signal "k" are equal to 1, the output signal from the vertical direction BPF 14 is transmitted to the horizontal direction BPF 16 via the subtracter 17 and the adder 21 without undergoing the attenuation by the multiplier 19. In addition, when the data of the motion signal "k" are equal to 1, the primary control signals "mv" and "mh" pass through the multipliers 23 and 25 without undergoing the attenuation by the multipliers 23 and 25 so that the final control signals "kmv" and "kmh" are in exact agreement with the primary control signals "mv" and "mh".

Figure 9:
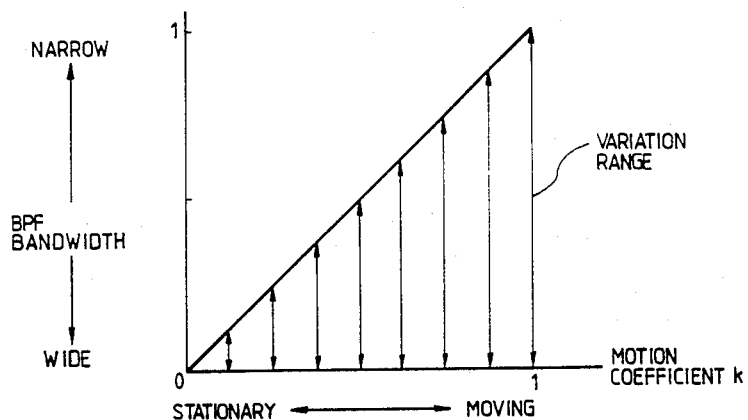
FIG. 9 is a diagram showing a variation range of control signals for the variable band pass filters with respect to the relationship between the horizontal direction band pass filter and the motion coefficient in the embodiment of FIG. 1.

As shown in FIG. 9, when the motion coefficient "k" equals 0, that is, when pictures are stationary or still, the pass bands of the vertical direction and horizontal direction BPFs 14 and 16 are maximized independent of conditions of the composite color television signal which occurs within a field. As the motion coefficient "k" increases, that is, as the degree of motion of pictures increases, the pass bands of the BPFs 14 and 16 are narrowed. In this case, the pass bands of the BPFs 14 and 16 depend on conditions of the composite color television signal which occurs within a field. Accordingly, the pass bands of the BPFs 14 and 16 are controlled optimally in accordance with three-dimensional conditions of the composite color television signal along the time axis, the horizontal axis, and the vertical axis.

It is preferable that the primary control signals "mv" and "mh" and the motion signal "k" have 4 bits. The multipliers 23 and 25 are preferably of 4-bit by 4-bit type.

Figure 8:
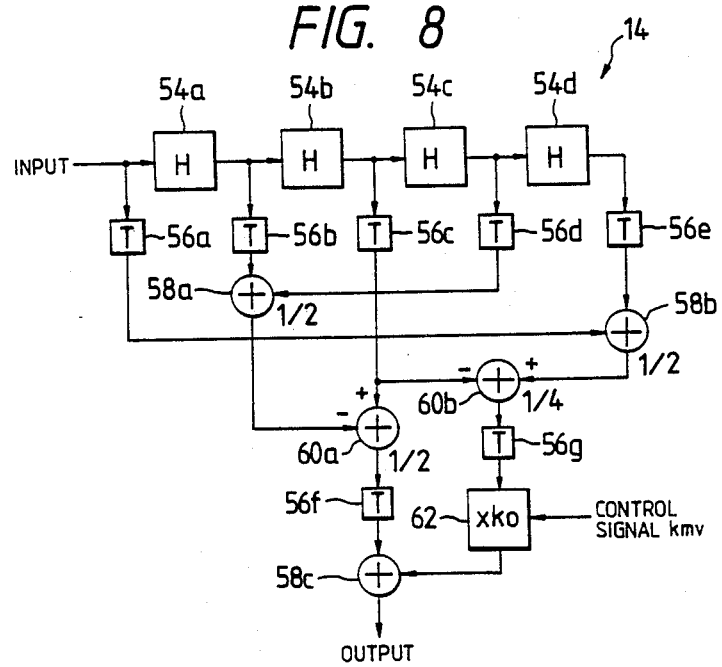
FIG. 8 is a block diagram of the vertical direction band pass filter of FIG. 1.

As shown in FIG. 8, the vertical direction BPF 14 includes a one-line delay circuit 54a and a one-sample delay circuit 56a into which the composite color television signal is inputted. The delay circuit 54a delays the input signal by a period corresponding to one horizontal scanning period (1H). The delay circuit 56a delays the input signal by a period corresponding to one sampling period (1T). The output signal from the delay circuit 54a is fed to a one-line delay circuit 54b and a one-sample delay circuit 56b. The delay circuit 54b delays the input signal by a period corresponding to one horizontal scanning period (1H). The delay circuit 56b delays the input signal by a period corresponding to one sampling period (1T). The output signal from the delay circuit 54b is fed to a one-line delay circuit 54c and a one-sample delay circuit 56c. The delay circuit 54c delays the input signal by a period corresponding to one horizontal scanning period (1H). The delay circuit 56c delays the input signal by a period corresponding to one sampling period (1T). The output signal from the delay circuit 54c is fed to a one-line delay circuit 54d and a one-sample delay circuit 56d. The delay circuit 54d delays the input signal by a period corresponding to one horizontal scanning period (1H). The delay circuit 56d delays the input signal by a period corresponding to one sampling period (1T). The output signal from the delay circuit 54d is fed to a one-sample delay circuit 56e. The delay circuit 56e delays the input signal by a period corresponding to one sampling period (1T). The output signals from the delay circuits 56a, 56b, 56c, 56d, and 56e are applied to a first input terminal of an adder 58b, a first input terminal of an adder 58a, a plus input terminal of a subtracter 60a, a second input terminal of the adder 58a, and a second input terminal of the adder 58b respectively. The adders 58a and 58b are of the type, dividing the sum of the input data by two and outputting the resultant data. The output signal from the adder 58a is applied to a minus input terminal of the subtracter 60a. The subtracter 60a is of the type, dividing the difference between the input data by two and outputting the resultant data. The output signal from the subtracter 60a is fed to a one-sample delay circuit 56f. The delay circuit 56f delays the input signal by a period corresponding to one sampling period (1T). The output signal from the delay circuit 56f is applied to a first input terminal of an adder 58c. The output signal from the adder 58b is applied to a plus input terminal of a subtracter 60b. A minus input terminal of the subtracter 60b is subjected to the output signal from the delay circuit 56c. The subtracter 60b is of the type, dividing the difference between the input data by four and outputting the resultant data. The output signal from the subtracter 60b is applied to a one-sample delay circuit 56g. The delay circuit 56g delays the input signal by a period corresponding to one sampling period (1T). The output signal from the delay circuit 56g is fed to a first input terminal of a multiplier 62. A second input terminal of the multiplier 62 is subjected to the final control signal "kmv" outputted from the multiplier 23 (see FIG. 1). The multiplier 62 calculates a value which equals the output data from the delay circuit 56g multiplied by a variable coefficient "ko". The coefficient "ko" varies between $-\frac{3}{4}$ and $+\frac{3}{4}$ in accordance with the final control signal "kmv". The output signal from the multiplier 62 is applied to a second input terminal of the adder 58c. The output signal from the adder 58c is fed to the horizontal direction BPF 16 (see FIG. 1). The pass band width of the vertical direction BPF 14 is varied with the coefficient "ko". With respect to a variation in the coefficient "ko" between $-\frac{3}{4}$ and $+\frac{3}{4}$, the maximal pass band width is approximately twice the minimal pass band width.

The horizontal direction BPF 16 is similar to the vertical direction BPF 14 of FIG. 8 except that the delay times determined by delay circuits 54a–54d correspond to two sampling periods (2T).

DESCRIPTION OF THE SECOND PREFERRED EMBODIMENT

Figure 12:
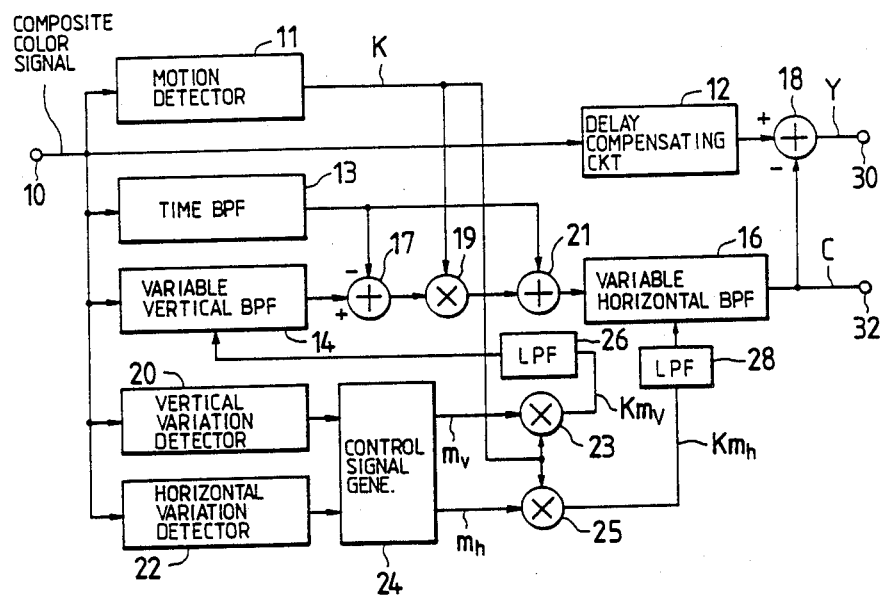
FIG. 12 is a block diagram of a motion-adaptive device for separating a luminance signal and a color signal according to a second embodiment of this invention.

FIG. 12 shows a second embodiment of this invention which is similar to the embodiment of FIGS. 1–11 except that a vertical direction low pass filter (LPF) 26 is connected between the multiplier 23 and the vertical direction BPF 14 and that a horizontal direction low pass filter (LPF) 28 is connected between the multiplier 25 and the horizontal direction BPF 16.

Control signals "kmv" and "kmh" outputted from multipliers 23 and 25 are applied to a vertical direction BPF 14 and a horizontal direction BPF 16 via the vertical direction LPF 26 and the horizontal direction LPF 28 respectively. The characteristics of the LPFs 26 and 28 are designed so as to depend on the directions along which the BPFs 14 and 16 filter the signals, that is, the objective directions of filtering in the BPFs 14 and 16 respectively. This design of the LPFs 26 and 28 allows a smooth variation in the characteristics of the BPFs 14 and 16 and also prevents the filtered signals from being unacceptably discontinuous.

DESCRIPTION OF THE THIRD PREFERRED EMBODIMENT

Figure 13:
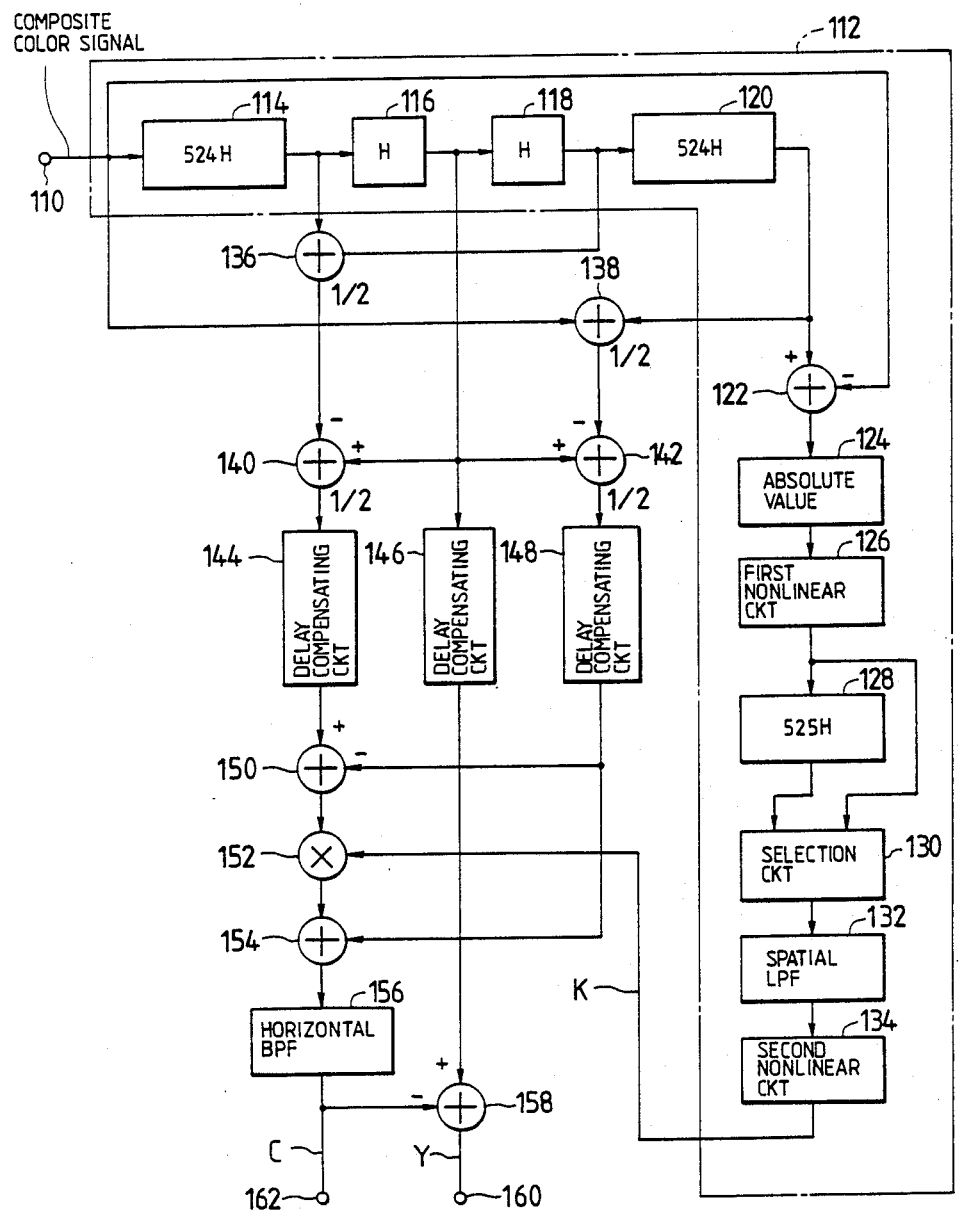
FIG. 13 is a block diagram of a motion-adaptive device for separating a luminance signal and a color signal according to a third embodiment of this invention.

With reference to FIG. 13, an input terminal 110 is subjected to a digital composite color television signal which is derived from an analog composite color television signal by an analog-to-digital (A/D) converter (not shown). The A/D converter samples the analog composite color television signal at a predetermined sampling period T and sequentially converts sampled levels into corresponding digital data. The digital composite color television signal is also referred to as a composite color signal.

The digital composite color television signal is fed via the input terminal 110 to a motion detector 112. The motion detector 112 includes 524H delay circuits 114 and 120, and 1H delay circuits 116 and 118 which together form a 2-frame delay circuit. It should be noted that 1H corresponds to 1 line. The 2-frame delay circuit derives a 2-frame delayed composite color signal from the input composite color signal. The non-delayed composite color signal and the 2-frame delayed composite color signal are fed to a subtracter 122, which derives a difference signal representing the difference between the non-delayed and delayed composite color signals. The delay circuits 114, 116, 118, and 120 are structural elements of the motion detector and are also structural elements of a time direction band pass filter (BPF) and a vertical direction band pass filter (BPF) described hereinafter.

The difference signal outputted from the subtracter 122 is fed to an absolute-value converter 124 and is thereby converted into an absolute value signal representing the absolute value of the data of the difference signal. The absolute value signal is fed via a first nonlinear circuit 126 to a 525H delay circuit 128 and a first input terminal of a selection circuit 130. An output signal from the delay circuit 128 is fed to a second input terminal of the selection circuit 130. The delay circuit 128 and the selection circuit 130 form a time direction low pass filter (LPF). The selection circuit 130 is of the known type, selecting the greater of the two input signals and passing the selected input signal. An output signal from the selection circuit 130 is fed to a second nonlinear circuit 134 via a spatial low pass filter (LPF) 132. The nonlinear circuit 134 outputs a motion signal representing a motion coefficient "k". The motion signal is applied to a multiplier 152. The spatial LPF 132 is composed of a cascade combination of a vertical direction LPF and a horizontal direction LPF.

A signal which appears a tap between the delay circuits 114 and 116 is fed to a first input terminal of an adder 136. A signal which appears a tap between the delay circuits 118 and 120 is fed to a second input terminal of the adder 136. The adder 136 adds the data of the two input signals and divides the resultant data sum by two. The non-delayed composite color signal and the 2-frame delayed composite color signal outputted from the delay circuit 120 are added by an adder 138. The adder 138 is of the type, dividing the resultant sum by two. A signal which appears at a tap between the delay circuits 116 and 118 is fed to plus input terminals of subtracters 140 and 142, and is fed via a delay compensating circuit 146 to a plus input terminal of a subtracter 158. An output signal from the adder 136 is applied to a minus input terminal of the subtracter 140. An output signal from the adder 138 is applied to a minus input terminal of the subtracter 142. The subtracters 140 and 142 are of the type, calculating the difference between the data of the two input signals and dividing the resultant data difference by two. An output signal from the subtracter 140 is fed to a delay compensating circuit 144 composed of a delay circuit. An output signal from the subtracter 142 is fed to a delay compensating circuit 148 composed of a delay circuit. An output signal from the delay compensating circuit 144 is applied to a plus input terminal of a subtracter 150. An output signal from the delay compensating circuit 148 is applied to a minus input terminal of the subtracter 150 and a first input terminal of an adder 154. The multiplier 152 multiplies the data of an output signal from the subtracter 150 by the motion coefficient "k". An output signal from the multiplier 152 is applied to a second input terminal of the adder 154. The adder 154 adds the data of the two input signals. An output signal from the adder 154 is fed to a horizontal direction band pass filter (BPF) 156. The horizontal direction BPF 156 is preferably composed of a known transversal filter having a 3.58 MHz pass band. The horizontal direction BPF 156 extracts a color signal C from the input signal. The color signal C is applied to an output terminal 162 and a minus input terminal of the subtracter 158. The subtracter 158 subtracts the color signal components from the composite color signal and thereby derives a luminance signal Y fed to an output terminal 160.

The delay compensating circuits 144, 146, and 148 compensate delay times caused by the spatial LPF 132 which is described in detail hereinafter. For example, each of the delay compensating circuits 144, 146, and 148 includes a flip-flop and a line memory.

The delay circuits 116 and 118, the adder 136, and the subtracter 140 form a vertical direction BPF. The delay circuits 114, 116, 118, and 120, the adder 138, and the subtracter 142 form a time direction BPF. The time direction BPF and the vertical direction BPF have a linear phase relationship.

The arrangement except the motion detector 112 is basically similar to the corresponding portion of known Y/C signal separation devices (for example, see Japanese published examined patent application No. 61-58079). The structure of the motion detector 112 is new. Another new point of the signal separation device of FIG. 13 is that the output signals from the time direction BPF and the vertical direction BPF are mixed at a rate which is varied in accordance with the motion coefficient "k". In known Y/C signal separation devices, one of the output signals from the BPFs is selected by a switch in accordance with the motion of pictures.

The motion detector 112 will be described further hereinafter. As described previously, the subtracter 122 generates the difference signal which represents the difference between the non-delayed composite color signal and the 2-frame delayed composite color signal.

The 2-frame delay circuit which is composed of the delay circuits 114, 116, 118, and 120 has five taps. The portions of the 2-frame delay circuit are used to form the time direction BPF and the vertical direction BPF via these taps.

The difference signal which is outputted from the subtracter 122 is converted by the absolute value circuit 124 into the absolute value signal representing the absolute value of the data of the difference signal. The absolute value signal is inputted into the first nonlinear circuit 126.

Figure 14:
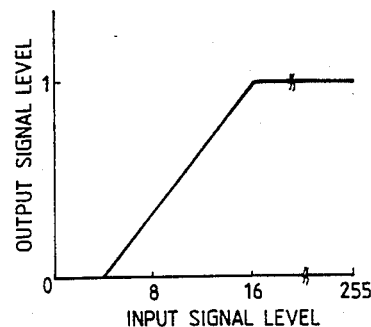
FIG. 14 is a diagram showing input-output characteristics of the first nonlinear circuit of FIG. 13.

FIG. 14 shows input-output characteristics of the first nonlinear circuit 126. As shown in FIG. 14, the output signal level remains 0 when the input signal level is equal to or smaller than 4 which corresponds to a noise level. The output signal level increases linearly from 0 to 1 as the input signal level increases from 4 to 16. The output signal level remains 1 which corresponds to a saturation level when the input signal level is equal to or greater than 16. The first nonlinear circuit 126 functions to convert the difference between data at each dot of successive frames into a fully useful signal. Accordingly, in the function of the first nonlinear circuit 126, small differences are ignored and large differences are limited so that the motion of pictures can be detected substantially independent of the degree of the amplitude of pictures. The limitation on the difference suppresses erroneous operation due to pulse noises. It is preferable that the output signal from the first nonlinear circuit 126 has 2 bits (varible among 4 different levels) or 4 bits (variable among 16 different levels).

The output signal from the first nonlinear circuit 126 is inputted into a spatiotemporal filter including a time direction LPF and a spatial LPF. The time direction LPF is composed of the delay circuit 128 and the selection circuit 130. The time direction LPF is used to detect a variation at a central tap which can not be detected on the basis of the difference between frames separated at an interval corresponding to 2 frames. The central tap corresponds to a junction between the delay circuits 116 and 118. The 1-frame delayed difference signal which is generated by the delay circuit 128 is additionally used in the motion detection so that a motion can be detected on the basis of whether or not a variation occurs in at least one of signals appearing at three taps which correspond to the input terminal of the delay circuit 114, the junction between the delay circuits 116 and 118, and the output terminal of the delay circuit 120 respectively.

Figure 15:
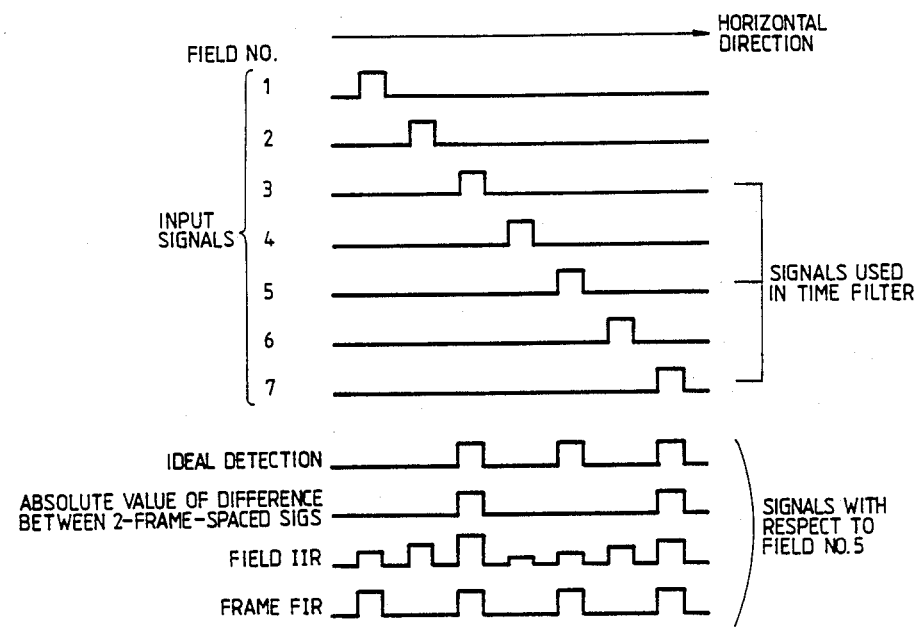
FIG. 15 is a diagram showing operation of the time direction low pass filter in the motion detector of FIG. 13.

The function of the time direction LPF will be described further with reference to FIG. 15. When a vertical line of a given width moves horizontally at a constant speed in a picture screen, the input signals corresponding to respective fields vary as shown in FIG. 15. The detection signal which is derived by the detection using the difference between frames separated at a two-frame interval lacks a central motion detection data present in the detection signal derived by ideal detection. If such a drawback is removed by an infinite impulse response filter using a field delay circuit, the level of the target motion detection data is considerably smaller than that obtained in the ideal detection and spurious motion detection data result from unnecessary field components. In the case where the previously-mentioned drawback is removed by a finite impulse response filter using a frame delay circuit, that is, in the case of this embodiment, appropriate motion detection is performed with respect to the three taps although an unnecessary motion detection data corresponding to one frame is generated. The selection circuit 130 selects the greater of the non-delayed and delayed difference signals and passes the selected difference signal to the spatial LPF 132. It should be noted that the selection circuit 130 may be replaced with an adder adding the non-delayed and delayed difference signals.

The spatial LPF 132 is used to detect the degrees of variations at dots within a predetermined picture region in order to determine the motion of pictures. The spatial LPF 132 and the second nonlinear circuit 134 determine the motion of pictures on the basis of the degrees of variations of respective dots and on the basis of the number of dots subjected to variations in the predetermined picture region. This motion detection is insensitive to an isolated local variation even if the variation is great. Accordingly, the motion detection is protected from pulse noises and small shifts of edges of pictures. The motion detection is sensitive to a variation occurring over a wide picture region even if the variation has a small amplitude.

As shown in FIG. 17, the spatial LPF 132 includes 1H delay circuits 132a and 132b, 2T delay circuits 132c and 132d, and adders 132e, 132f, 132g, and 132h. The 1H delay circuits 132a and 132b, and the adders 132e and 132f are connected to form a vertical direction LPF subjected to an input signal. The 2T delay circuits 132c and 132d, and the adders 132g and 132h are connected to form a horizontal direction LPF. The vertical direction LPF and the horizontal direction LPF are connected in cascade. The horizontal direction LPF generates a filter output signal of the spatial LPF 132. The adders 132e–132h are of the type, adding input data and dividing the resultant data sum by two. As shown in FIGS. 18(A) and 18(B), the spatial LPF 132 passes low frequency components in vertical and horizontal frequency ranges. In FIG. 18(B), the character "fsc" denotes the color subcarrier frequency.

Figure 16:
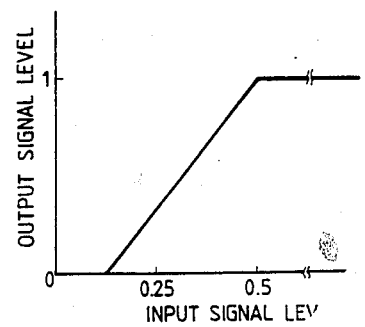
FIG. 16 is a diagram showing input-output characteristics of the second nonlinear circuit of FIG. 13.

FIG. 16 shows input-output characteristics of the second nonlinear circuit 134. As shown in FIG. 16, the output signal level remains 0 when the input signal level is equal to or smaller than a first predetermined level. The output signal level increases linearly from 0 to 1 as the input signal level increases from the first predetermined level to a second predetermined level. The output signal level remains 1 which corresponds to a saturation level when the input signal level is equal to or greater than the second predetermined level. Accordingly, the input signal whose level is equal to or smaller than the first predetermined level is omitted from the motion detection. On the other hand, the input signal whose level is equal to or greater than the second predetermined level is fully regarded as motion of pictures. The output signal from the first nonlinear circuit 126 has a plurality of bits as described previously and the spatial filter 132 has a gentle response curve so that the processing for moving pictures and the processing for stationary pictures can be changed smoothly.

As described previously, the spatial LPF 132 removes a local variation which occurs at an isolated point in a picture. Signal components corresponding to white noises are transformed by the first nonlinear circuit 126 into pulses, which are smoothed by the subsequent spatiotemporal filter. As a result, the level of white noise components is held smaller than the lower predetermined level in the second nonlinear circuit 134 and thus the noise components are cut off by the second nonlinear circuit 134. Signal components corresponding to pulse noises and shifts of picture edges are limited in level by the first nonlinear circuit 126 and are then decreased in level by the time direction LPF and the spatial LPF 132 so that they are cut off by the second nonlinear circuit 134.

It should be noted that the output signal from the first nonlinear circuit 126 may have a single bit and the spatial LPF 132 may have a rectangular response curve. In this case, the motion of pictures is detected only on the basis of the number of dots subjected to variations in a tap region of the spatial LPF 132.

In the case where an analog composite color signal is sampled at a frequency which equals four times the color subcarrier frequency, the taps of the spatial LPF 132 are preferably chosen to define a picture region whose vertical dimension corresponds to 3 to 5 lines and whose horizontal dimension corresponds to 3 to 11 dots. This picture region contains 21 to 55 dots. The processing bit number of the spatial LPF 132 is preferably chosen to correspond to the bit number of the first nonlinear circuit 126.

It should be noted that this embodiment may be modified in various manners. In an example of such modifications of the embodiment, the time direction LPF which includes the delay circuit 128 and the selection circuit 130 is omitted and the output signal from the first nonlinear circuit 126 is directly fed to the spatial LPF 132.

DESCRIPTION OF THE FOURTH PREFERRED EMBODIMENT

Figure 19:
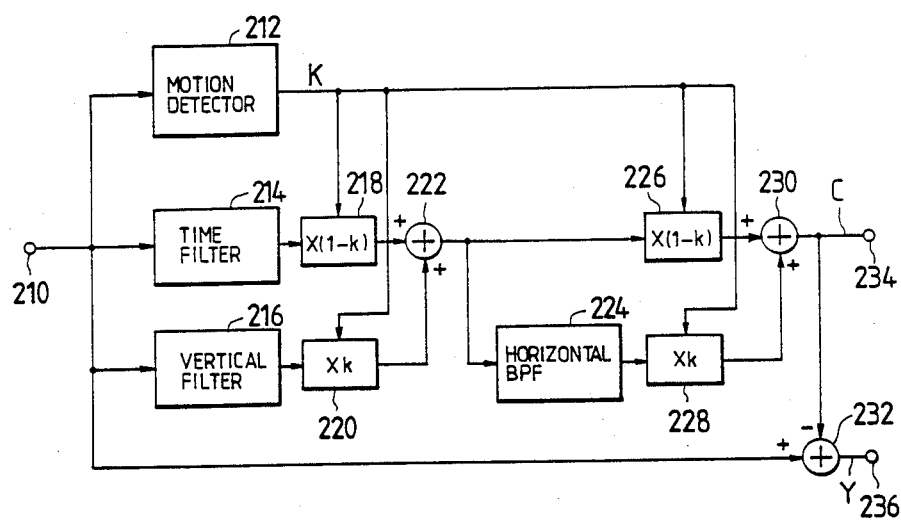
FIG. 19 is a block diagram of a motion-adaptive device for separating a luminance signal and a color signal according to a fourth embodiment of this invention.

With reference to FIG. 19, an input terminal 210 is subjected to a digital composite color television signal which is derived from an analog composite color television signal by an analog-to-digital (A/D) converter (not shown). The A/D converter samples the analog composite color television signal at a predetermined sampling period and sequentially converts sampled levels into corresponding digital data. The digital composite color television signal is also referred to as a composite color signal. The digital composite color television signal is fed via the input terminal 210 to a motion detector 212, a time direction filter 214, and a vertical direction filter 216, and a plus input terminal of a subtracter 232.

The motion detector 212 includes frame memories and a subtracter. The motion detector 212 calculates the difference between data at the same picture elements of equally separated frames and thereby detects the motion of pictures represented by the input composite color television signal. An output signal from the motion detector 212 represents a motion coefficient "k" which varies between 0 and 1 in accordance with the degree of motion of pictures. The output signal from the motion detector 212 will be referred to as the motion signal "k" hereinafter. It is preferable that the motion detector 212 is similar to the motion detector 112 of FIG. 13.

The time direction filter 214 processes the input composite color television signal in filtering operation along a time direction parallel with intervals between frames. Specifically, the time direction filter 214 operates on the basis of a correlation between two or more successive frames. The vertical direction filter 216 processes the input composite color television signal in filtering operation along the vertical direction in a field. A multiplier 218 multiplies the output signal from the time direction filter 214 by a factor of "1-k" which is calculated from the motion signal "k". A multiplier 220 multiplies the output signal from the vertical direction filter 216 by a factor of "k" given by the motion signal "k". Output signals from the multipliers 218 and 220 are added by an adder 222.

An output signal from the adder 222 is fed to a multiplier 226 and a vertical direction band pass filter (BPF) 224. The multiplier 226 multiplies the output signal from the adder 222 by a factor of "1-k" which is calculated from the motion signal "k". The horizontal direction BPF 224 processes the input signal in band pass filtering operation along the horizontal direction in a field. A multiplier 228 multiplies the output signal from the horizontal direction BPF 224 by a factor of "k" given by the motion signal "k". Output signals from the multipliers 226 and 228 are added by an adder 230 and are thereby combined into a color signal C applied to an output terminal 234. The subtracter 232 subtracts the color signal C from the composite color television signal and thereby generates a luminance signal Y applied to an output terminal 236.

As the degree of motion of pictures increases from its minimum to its maximum, the motion coefficient "k" increases from 0 to 1. In the case of moving pictures corresponding to a relatively great motion coefficient "k", a larger percentage of the output signal from the vertical direction filter 216 and a smaller percentage of the output signal from the time direction filter 214 are mixed by the adder 222, and a larger percentage of the output signal from the horizontal direction BPF 224 and a smaller percentage of the output signal from the adder 222 are mixed by the adder 230. Accordingly, in this case, the vertical direction filter 216 and the horizontal direction filter 224 are more effective than the time direction filter 214 so that the band of the resulting color signal C is narrowed. In the case of substantially still pictures corresponding to a small motion coefficient "k", a smaller percentage of the output signal from the vertical direction filter 216 and a larger percentage of the output signal from the time direction filter 214 are mixed by the adder 222, and a smaller percentage of the output signal from the horizontal direction BPF 224 and a larger percentage of the output signal from the adder 222 are mixed by the adder 230. Accordingly, in this case, the time direction filter 214 is more effective than the vertical direction filter 216 and the horizontal direction filter 224 so that the band of the resulting color signal C is widened. In this embodiment, the combination of the multipliers 226 and 228 and the adder 230 enables the pass band of the horizontal direction BPF 224 to vary in accordance with the degree of motion of pictures. This control of the pass band of the horizontal direction BPF 224 effectively prevents dot interference in still pictures and cross color in moving pictures.

DESCRIPTION OF THE FIFTH PREFERRED EMBODIMENT

Figure 20:
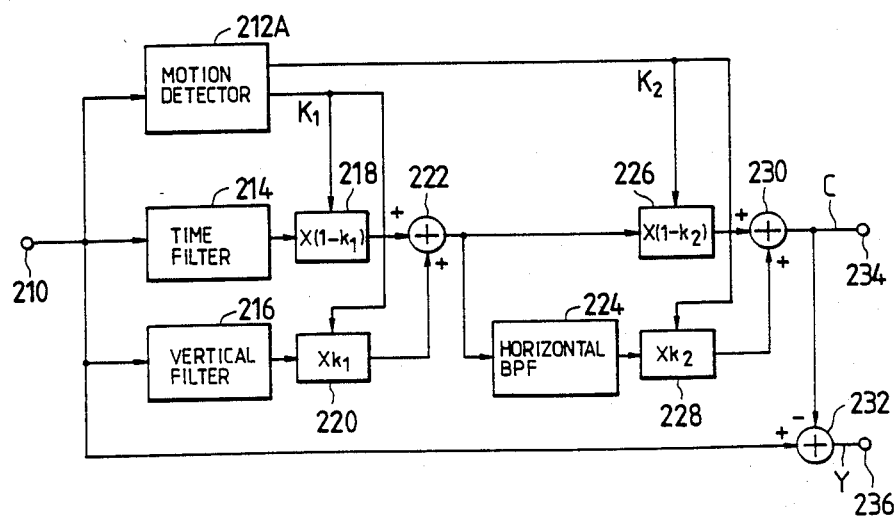
FIG. 20 is a block diagram of a motion-adaptive device for separating a luminance signal and a color signal according to a fifth embodiment of this invention.

FIG. 20 shows a fifth embodiment of this invention which is similar to the embodiment of FIG. 19 except for the following design change.

In the embodiment of FIG. 20, a motion detector 212A outputs a motion coefficient "k1" to multipliers 218 and 220 and outputs a motion coefficient "k2" to multipliers 226 and 228. Both of the motion coefficients "k1" and "k2" depend on the degree of motion of pictures and are variable between 0 and 1. The motion coefficients "k1" and "k2" are in a predetermined relationship.

Figure 21:
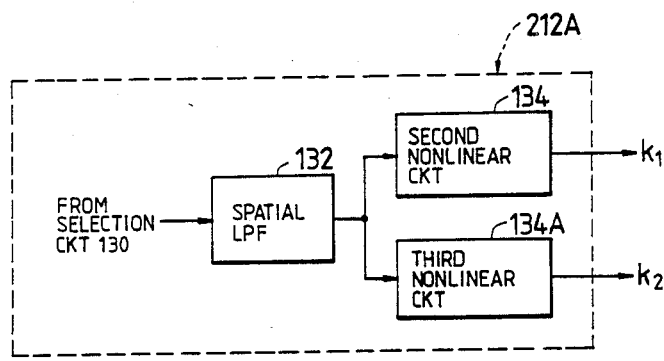
FIG. 21 is a block diagram of a portion of the motion detector of FIG. 20.
Figure 22:
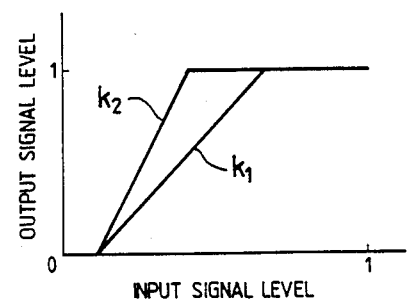
FIG. 22 is a diagram showing input-output characteristics or the second and third nonlinear circuits of FIG. 21.

FIG. 21 shows a portion of the motion detector 212A. The motion detector 212A is similar to the motion detector 112 of FIG. 13 except that a third nonlinear circuit 134A is added. A second nonlinear circuit 134 converts an output signal from a spatial LPF 132 into a motion signal "k1". Input-output characteristics of the second nonlinear circuit 134 are denoted by the line "k1" in FIG. 22. The third nonlinear circuit 134A converts the output signal from the spatial LPF 132 into a motion signal "k2". Input-output characteristics of the third nonlinear circuit 134A are denoted by the line "k2" in FIG. 22. The motion signal "k2" is chosen so as to enhance the effectiveness of the time direction filter 214 in an intermediate picture motion range. Accordingly, moderate motion of pictures can be accurately detected.

What is claimed is:

1. A motion-adaptive device for separating a luminance signal and a color signal, comprising:
   (a) a motion detector detecting motion of pictures represented by a composite color signal, the motion detector generating a motion signal representing the detected motion of pictures;
   (b) a spatiotemporal filter processing the composite color signal;
   (c) means for varying the signal processing in the spatiotemporal filter in accordance with the motion signal;
   (d) means for separately deriving a color signal and a luminance signal from an output signal of the spatiotemporal filter and the composite color signal;
   wherein the motion detector comprises:
   (a1) means for deriving a difference between frames of the composite color signal and generating a difference signal representative of the derived difference;
   (a2) means for deriving an absolute value of the difference signal and generating an absolute value signal representative of the derived absolute value;
   (a3) a first nonlinear circuit limiting the absolute value signal;
   (a4) a spatiotemporal low pass filter processing an output signal from the first nonlinear circuit; and
   (a5) a second nonlinear circuit limiting an output signal from the spatial low pass filter and converting the output signal from the spatial low pass filter into the motion signal.

2. The device of claim 1 wherein the motion detector further comprises a temporal low pass filter connected between the first nonlinear circuit and the spatial low pass filter.

3. The device of claim 1 wherein the spatiotemporal filter includes a time-direction low pass filter having taps for respective frames, and field signals between the taps are unused as taps of a digital filter.

4. The detector of claim 1 wherein the difference deriving means comprises a delay circuit delaying the composite color signal by a period corresponding to two frames and thereby converting the non-delayed composite color signal into a delayed composite color signal, and a subtracter subtracting the non-delayed composite color signal from the delayed composite color signal, wherein the delay circuit comprises a first 524H delay element, a first 1H delay element, a second 1H delay element, and a second 524H delay element connected in cascade, and the first and second 524H delay elements and the first and second 1H delay elements are used in common as elements forming the spatiotemporal filter, and wherein the character H denotes one horizontal scanning period.

5. A motion detector comprising:
   (a) means for deriving a difference between frames of the composite color signal and generating a difference signal representative of the derived difference;
   (b) means for deriving an absolute value of the difference signal and generating an absolute value signal representative of the derived absolute value;
   (c) a first nonlinear circuit limiting the absolute value signal;
   (d) a spatial low pass filter processing an output signal from the first nonlinear circuit; and
   (e) a second nonlinear circuit limiting an output signal from the spatial low pass filter and converting the output signal from the spatial low pass filter into the motion signal.

6. The detector of claim 5 wherein the difference deriving means comprises a delay circuit delaying the composite color signal by a period corresponding to two frames and thereby converting the non-delayed composite color signal into a delayed composite color signal, and a subtracter subtracting the non-delayed composite color signal from the delayed composite color signal.

7. The detector of claim 5 wherein the output level of the first nonlinear circuit remains 0 as the level of the absolute value signal increases from 0 to a first predetermined level corresponding to a noise level, the output level of the first nonlinear circuit increases from 0 to 1 as the level of the absolute value signal increases from the first predetermined level to a second predetermined level, and the output level of the first nonlinear circuit remains 1 as the level of the absolute value signal increases from the second predetermined level.

8. The detector of claim 5 wherein the output level of the second nonlinear circuit remains 0 as the level of the output signal from the spatial low pass filter increases from 0 to a first predetermined level corresponding to a noise level, the output level of the second nonlinear circuit increases from 0 to 1 as the level of the output signal from the spatial low pass filter increases from the first predetermined level to a second predetermined level, and the output level of the second nonlinear circuit remains 1 as the level of the output signal from the spatial low pass filter increases from the second predetermined level.

9. The detector of claim 5 further comprising a temporal low pass filter connected between the first nonlinear circuit and the spatial low pass filter.

10. The detector of claim 9 wherein the temporal low pass filter comprises a delay circuit delaying the output signal from the first nonlinear circuit by a period corresponding to one frame, and a selection circuit selecting and passing a greater of the output signal from the first nonlinear circuit and an output signal from the delay circuit.

* * * * *